US011170634B2

(12) United States Patent
Kumar M et al.

(10) Patent No.: US 11,170,634 B2
(45) Date of Patent: Nov. 9, 2021

(54) METHOD AND DEVICE FOR AUTOMATED ASSOCIATION OF SENSORS WITH ENTITIES

(71) Applicant: Wipro Limited, Bangalore (IN)

(72) Inventors: Vijay Kumar M, Bangalore (IN); Abhishek Amalkumar Haldar, Bengaluru (IN)

(73) Assignee: Wipro Limited, Bangalore (IN)

(*) Notice: Subject to any disclaimer, the term of this patent is extended or adjusted under 35 U.S.C. 154(b) by 162 days.

(21) Appl. No.: 16/702,940

(22) Filed: Dec. 4, 2019

(65) Prior Publication Data
US 2021/0097849 A1    Apr. 1, 2021

(30) Foreign Application Priority Data

Oct. 1, 2019  (IN) .............................. 201941039647

(51) Int. Cl.
| | | |
|---|---|---|
| *G08B 29/18* | (2006.01) | |
| *H04W 4/029* | (2018.01) | |
| *G08B 21/18* | (2006.01) | |
| *H04L 29/08* | (2006.01) | |

(52) U.S. Cl.
CPC ......... *G08B 29/185* (2013.01); *G08B 21/182* (2013.01); *H04L 67/12* (2013.01); *H04W 4/029* (2018.02)

(58) Field of Classification Search
CPC ..... G08B 21/182; G08B 29/185; H04L 67/12; H04W 4/029; H04W 4/023; H04W 4/80
See application file for complete search history.

(56) References Cited

U.S. PATENT DOCUMENTS

| | | | |
|---|---|---|---|
| 7,714,778 B2 | 5/2010 | Dupray | |
| 8,457,656 B2 | 6/2013 | Perkins et al. | |
| 9,813,867 B2 | 11/2017 | Prevatt | |
| 2004/0215532 A1* | 10/2004 | Boman | G06Q 10/087 705/28 |
| 2005/0157865 A1* | 7/2005 | Yeager | G07C 11/00 379/266.06 |
| 2007/0080804 A1* | 4/2007 | Hirahara | G06K 7/10178 340/572.1 |
| 2012/0223812 A1* | 9/2012 | Kail | H01Q 1/3283 340/10.1 |

* cited by examiner

*Primary Examiner* — Omer S Khan
(74) *Attorney, Agent, or Firm* — Finnegan, Henderson, Farabow, Garrett & Dunner, LLP

(57) ABSTRACT

A method and a device for associating sensors with entities within a stack is disclosed. In an embodiment, the method may include capturing at least one sensor parameter from each of a first plurality of sensors, wherein each of the first plurality of sensors is attached to an entity from a first plurality of entities placed within a stack. The method may further include determining a position of each of the first plurality of sensors relative to the stack, based on the associated at least one sensor parameter and a lookup table. The method may further include receiving an entity placement scheme within the stack, and associating each of the first plurality of sensors with one of the first plurality of entities within the stack to generate an association table, based on the position determined for each of the first plurality of sensors and the entity placement scheme.

16 Claims, 8 Drawing Sheets

| Sensor ID | Position (x, y, z) | RSSI | AoA |
|---|---|---|---|
| S1 | (1,1,2) | -10 dBm | 45° |
| S2 | (0,2,0) | -30 dBm | 55° |
| S3 | (1,0,2) | 0 dBm | 75° |
| S4 | (2,2,0) | -40 dBm | 145° |

METHOD AND DEVICE FOR AUTOMATED ASSOCIATION OF SENSORS WITH ENTITIES

TECHNICAL FIELD

This disclosure relates generally to logistics, and more particularly to a method and system for automated association of sensors with entities.

BACKGROUND

The advent of new technologies like Internet of things (IoT), Artificial Intelligence (AI), and Machine Learning (ML), have brought a significant difference in the way physical and digital elements interact with each other. These technologies hold potential to improve operations in various industries like logistics. For example, logistics companies ship multiple artefacts (like cartons and boxes) that require continuous monitoring of parameters, such as location, temperature, humidity, shock, etc. As such, a sensor is assigned or attached to each artifact.

In order to monitor the artifacts, a user has to manually associate a sensor to each artifact, and then manually maintain a record of each sensor-artifact association (as to which sensor is associated to what artifact). As a result, this process is labor intensive and time intensive. Moreover, there are high chances of error in maintaining these associations, when done manually. Furthermore, in case of an error, it is difficult to locate the artifact for which an alert (any condition is breached) has occurred (i.e. with respect to which the error has occurred).

By way of an example, a manual process of associating a sensor to each artifact includes tracking and scanning artifacts and sensors attached to them. For accurate associating, a user has to ensure that correct Identification (ID) of the artifact and the sensor pairs are scanned together. However, this is prone to human errors.

SUMMARY

In one embodiment, a method of associating sensors with entities within a stack is disclosed. The method may include capturing at least one sensor parameter from each of a first plurality of sensors, wherein each of the first plurality of sensors is attached to an entity from a first plurality of entities placed within a stack. The method may further include determining a position of each of the first plurality of sensors relative to the stack, based on the associated at least one sensor parameter and a lookup table generated for the stack. The method may further include receiving an entity placement scheme within the stack, wherein the entity placement scheme comprises an Identification (ID) of each of the first plurality of entities and a position of each of the first plurality of entities within the stack. The method may further include associating each of the first plurality of sensors with one of the first plurality of entities within the stack, based on the position determined for each of the first plurality of sensors and the entity placement scheme, to generate an association table.

In another embodiment, a method of generating a lookup table for associating sensors with entities within a stack is disclosed. The methods may include capturing at least one sensor parameter from each of a second plurality of sensors, wherein each of the second plurality of sensors is attached to an entity from a second plurality of entities placed within a stack. The method may further include receiving a position of each of the second plurality of sensors within the stack, wherein the position of each of the second plurality of sensors is predetermined based on a predetermined position of each of the second plurality of entities within the stack. The method may further include generating the lookup table, wherein, for each of the second plurality of sensors, the lookup table comprises mapping of the at least one sensor parameter to the associated position, and wherein the lookup table is used to determine a position of each of a first plurality of sensors relative to the stack, based on the at least one sensor parameter associated with each of the first plurality of sensors.

In another embodiment, a mapping device for associating sensors with entities within a stack is disclosed. The mapping device includes a processor and a memory communicatively coupled to the processor. The memory stores processor instructions, which, on execution, may cause the processor to capture at least one sensor parameter from each of a first plurality of sensors, wherein each of the first plurality of sensors is attached to an entity from a first plurality of entities placed within a stack, and determine a position of each of the first plurality of sensors relative to the stack, based on the associated at least one sensor parameter and a lookup table generated for the stack. The processor instructions, on execution, may further cause the processor to receive an entity placement scheme within the stack, wherein the entity placement scheme comprises an Identification (ID) of each of the first plurality of entities and a position of each of the first plurality of entities within the stack, and associate each of the first plurality of sensors with one of the first plurality of entities within the stack, based on the position determined for each of the first plurality of sensors and the entity placement scheme, to generate an association table.

In yet another embodiment, a non-transitory computer-readable storage medium is disclosed. The non-transitory computer-readable storage medium has stored thereon, a set of computer-executable instructions causing a computer comprising one or more processors to perform steps including: capturing at least one sensor parameter from each of a first plurality of sensors, wherein each of the first plurality of sensors is attached to an entity from a first plurality of entities placed within a stack; determining a position of each of the first plurality of sensors relative to the stack, based on the associated at least one sensor parameter and a lookup table generated for the stack; receiving an entity placement scheme within the stack, wherein the entity placement scheme comprises an Identification (ID) of each of the first plurality of entities and a position of each of the first plurality of entities within the stack; and associating each of the first plurality of sensors with one of the first plurality of entities within the stack, based on the position determined for each of the first plurality of sensors and the entity placement scheme, to generate an association table.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
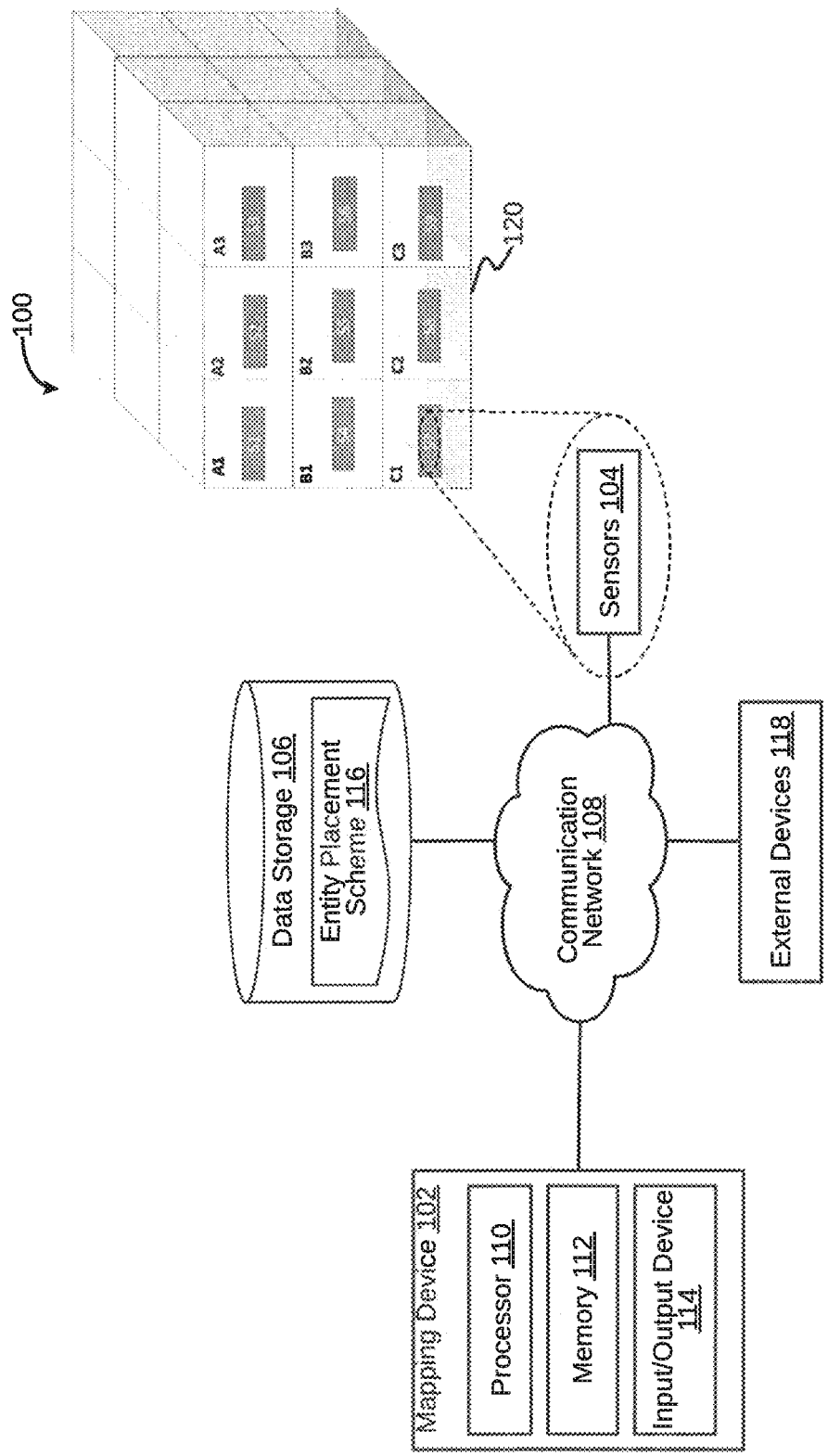
FIG. 1 illustrates a system for associating sensors with entities within a stack, in accordance with an embodiment.

In one embodiment, a system 100 for associating sensors with entities within a stack is illustrated in the FIG. 1, in accordance with an embodiment. The system 100 may include a mapping device 102, one or more sensors, hereinafter collectively referred to as sensors 104, and a data storage 106. The mapping device 102 may be a computing device having data processing capability. In particular, the mapping device 102 may have capability to associate the sensors 104 with entities within a stack. Examples of the mapping device 102 may include, but are not limited to a IoT Gateway, Compute Box, server, a desktop, a laptop, a notebook, a netbook, a tablet, a smartphone, a mobile phone, an application server, a sever, or the like. The stack, for example, may be a pallet and the entities may be cartons stacked on the pallet. The data storage 106 may store an entity placement scheme 116. The entity placement scheme 116 may include an Identification (ID) of each of a plurality of entities and a position of each of the plurality of entities within the stack. The data storage 106 may be communicatively coupled to the mapping device 102 via a communication network 108. The communication network 108 may be a wired or a wireless network and the examples may include, but are not limited to the Internet, Wireless Local Area Network (WLAN), Wi-Fi, Long Term Evolution (LTE), LoRAWAN, NB-IoT, Worldwide Interoperability for Microwave Access (WiMAX), and General Packet Radio Service (CPRS).

In some embodiments, the mapping device 102 may associate the sensors 104 with entities within a stack. To this end, the mapping device 102 may be coupled to the sensors 104 within a stack, via the communication network 108. Each sensor of the sensors 104 may include a communication module compliant with a wireless communication protocol. Accordingly, the mapping device 102 may include a communication module compliant with a wireless communication protocol. For example, The wireless communication protocol, for example, may include, but is not limited to a Bluetooth protocol, and particularly version 5.1 or higher of the Bluetooth protocol.

As will be described in greater detail in conjunction with FIG. 2 to FIG. 8, in order to associate the sensors 104 with entities within a stack, the mapping device 102 may capture at least one sensor parameter from each of the sensors 104. Each of the sensors 104 may be attached to an entity from a first plurality of entities placed within a stack. The mapping device 102 may further determine a position of each of the sensors 104 relative to the stack, based on the associated at least one sensor parameter and a lookup table generated for the stack. The mapping device 102 may further receive an entity placement scheme within the stack. The entity placement scheme may include an Identification (ID) of each of the first plurality of entities and a position of each of the first plurality of entities within the stack. The mapping device 102 may further associate each of the sensors 104 with one of the first plurality of entities within the stack, based on the position determined for each of the sensors 104 and the entity placement scheme, to generate an association table for the first plurality of entities and the sensors 104. For example, for a stack 120, the association table may at least include mapping of an entity A1 to a sensor S1, an entity A2 to a sensor S2, an entity A3 to a sensor S3, an entity B1 to a sensor S4, an entity B2 to a sensor S5, an entity B3 to a sensor S6, an entity C1 to a sensor S7, an entity C2 to a sensor S8, an entity C3 to a sensor S9.

In order to perform the above discussed functionalities, the mapping device 102 may include a processor 110 and a memory 112. The memory 112 may store instructions that, when executed by the processor 110, cause the processor 110 to associate the sensors 104 with entities within a stack, as discussed in greater detail in FIG. 2 to FIG. 8. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g., sensor parameter data (for example, sensor ID, an Angle of Arrival (AoA), a Time of Flight, a Received Signal Strength Indicator (RSSI)), position data of the sensors 104, a lookup table, an entity placement scheme, etc.) that may be captured, processed, and/or required by the system 100.

The mapping device 102 may further include one or more input/output devices 114 through which the mapping device 102 may interact with a user and vice versa. By way of an example, the input/output device 114 may be used to render the association table to a user. The system 100 may interact with one or more external devices 118 over the communication network 108 for sending or receiving various data. Examples of the one or more external devices 118 may include, but are not limited to a remote server, a digital device, or another computing system.

Figure 2:
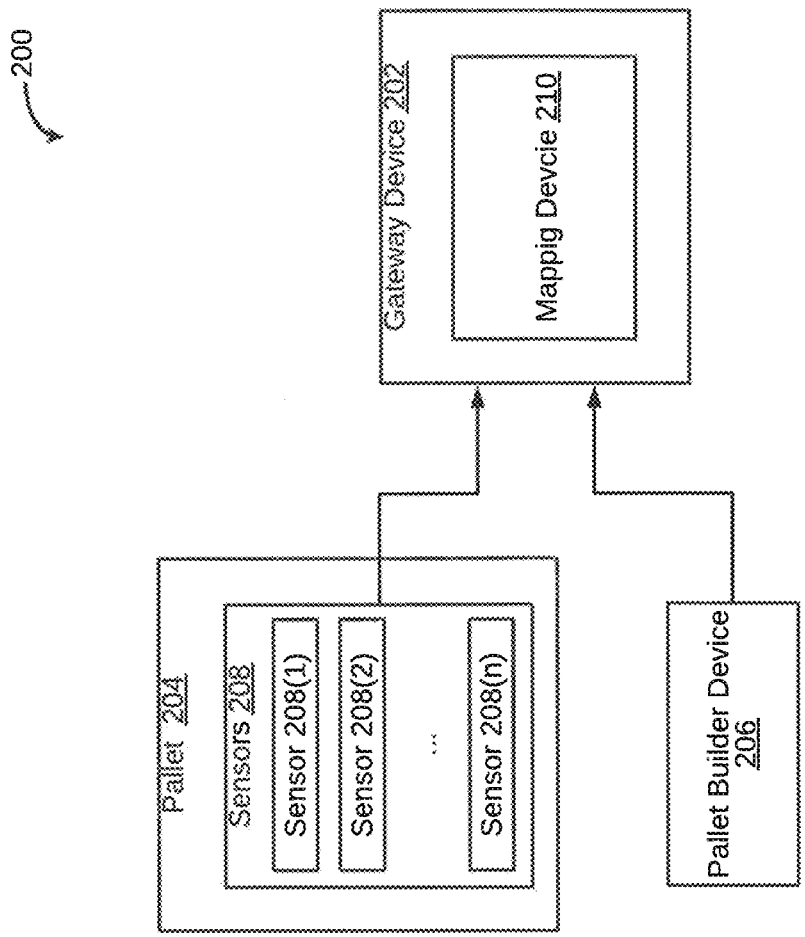
FIG. 2 is a functional block diagram of a system for associating sensors with entities placed within a pallet, in accordance with an embodiment.

Referring now to FIG. 2, a functional block diagram of a system 200 for associating sensors 208 with entities placed within a pallet 204 (i.e. stack), is illustrated, in accordance with an embodiment. The system 200 includes a gateway device 202, the pallet 204, and a pallet builder device 206. By way of an example, the pallet 204 may be a flat or a semi flat transportation structure. As such, the pallet 204 may be built in such a way so as to support a plurality of entities (for example, goods) in a stable fashion while being lifted by a machine. The machine, for example, may include, but is not limited to a forklift, a pallet jack, a front loader, a jacking device, or an erect crane. In other words, the pallet 204 may be the structural foundation of a unit load, which may allow handling and storage efficiencies. The pallet 204 may be built by piling the plurality of entities and securing with a strapping, or a stretch wrap, or shrink-wrap. As such, the pallet 204 may be suitable for being shipped. The plurality of entities within the pallet 204 may be fitted with sensors 208(1), 208(2) . . . 208(N), hereinafter, collectively referred to as sensors 208. By way of an example, the sensors 208 may be Bluetooth Low Energy (BLE) sensors. It may be noted that the sensor communication protocol may not be limited to Bluetooth Low Energy protocol, and in some embodiments, the sensors may be Ultra-wide Band (UWB), LoRAWAN or Zigbee enabled. The system 200 is further explained in detail in conjunction with FIG. 3.

Figure 3:
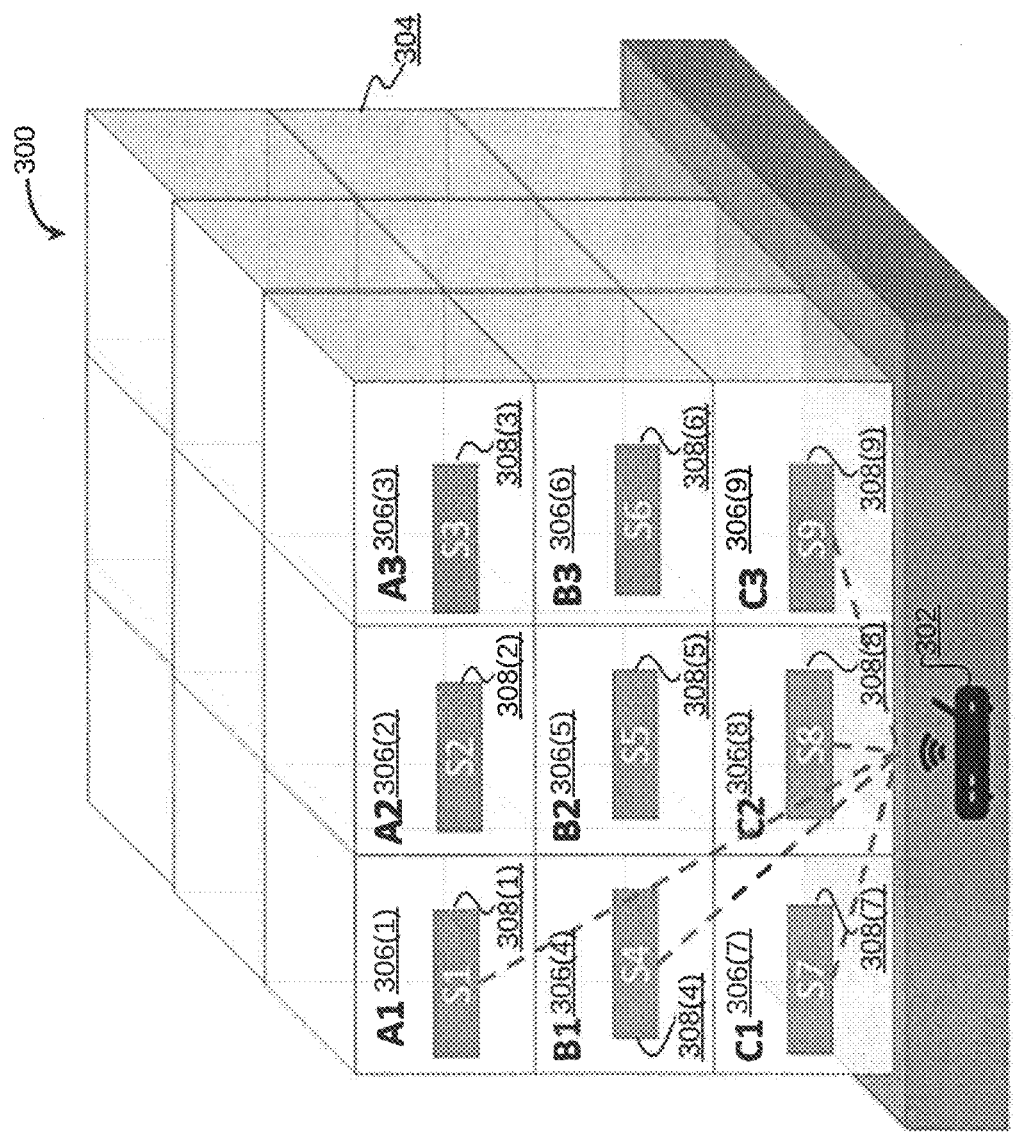
FIG. 3 illustrates a system for associating sensors with entities within a pallet, in accordance with another embodiment.

Referring now to FIG. 3, a system 300 for associating sensors with entities placed within a pallet is illustrated, in accordance with another embodiment. The system 300 may include a gateway device 302 (analogous to the gateway device 202) and a pallet 304 (analogous to the pallet 204). The pallet 304 may have a 3×3 configuration as shown in the FIG. 3. Thus, the pallet 304 may include 27 individual entities that are stacked to build the pallet 304 (having 3×3 configuration). For ease of explanation, the pallet 304 is considered to include nine entities, i.e., entities 306(1), 306(2) . . . 306(9), hereinafter referred to as entities 306. In some embodiments, the entities 306 may be stacked to build the pallet 304 in accordance with an entity placement scheme. Each entity of the entities 306 may have an entity ID, for example, A1, A2, A3, B1, B2, and so on. The entity placement scheme may include an Identification (ID) for each of the entities 306 and a position of each of the entities 306 within the pallet 304.

The system 300 may further include a plurality of sensors 308(1), 308(2) . . . 308(9), hereinafter referred to as sensors 308. By way of an example, each of the sensors 308 may be fitted onto one of the entities 306. Each of the sensors 308 may have a sensor ID, for example, S1, S2, S3, and so on.

Returning back to FIG. 2, each sensor of the sensors 208 may be configured to sense attributes of an entity it is attached to. Examples of the attributes may include, but are not limited to location, temperature, humidity, shock, light, tilt, etc. Each of the sensors 208 may be further configured to transmit attributes of the entity it is attached to. To this end, each of the sensors 208 may include a communication module (not shown in FIG. 2). It may be noted that the communication module may include a beacon capable of transmitting sensor data. In some embodiments, the communication module may be compliant with a wireless communication protocol. The wireless communication protocol, for example, may be, but is not limited to a Bluetooth protocol, and particularly version 5.1 or higher of the Bluetooth protocol.

The gateway device 202 may be configured to receive sensor data (i.e. the entities' parameters captured by the sensors 208) from the sensors 208. In some embodiments, the gateway device 202 may include a communication module (not shown in FIG. 2). The communication module may include a receiver capable of receiving the sensor data transmitted by the beacons of the sensors 208. As such, the communication module of the gateway device 202 may also be compliant with a wireless communication protocol, such as, a Bluetooth protocol (version 5.1 or higher). As it will be appreciated by those skilled in the art, Radio Direction Finding (RDF) has been added to the core specification of Bluetooth 5.1. This allows Bluetooth 5.1 enabled devices to determine direction of a signal transmitted from another Bluetooth device. As a result, one or more sensor parameters including an Angle of Arrival (AoA) and Received Signal Strength Indicator (RSSI) associated with each of the sensors 208 may be determined. The AoA and the RSSI may be used for accurate localization of each of the sensors 208.

As will be appreciated by those skilled in the art, in the AoA calculation, a device (for example, a sensor), for which a direction/location is to be determined, transmits a special direction-finding signal using a single antenna. A receiving device (for example, a mapping device or a gateway device) includes multiple antennae arranged in an array. As the transmitted signal crosses the array, the receiving device observes a signal phase difference due to the difference in distance from each of the antenna in its array to the transmitting antenna. As these antennas are placed at a given distance apart from each other, their received RF signals have a phase difference that is proportional to the difference between their respective distances from the sensor. The receiving device receives IQ (In-phase Quadrature) samples of the signal while switching between the active antenna in the array. Based on the IQ sample data, the receiving device can calculate the relative signal direction.

For added accuracy, with RSSI, the receiving device is able to determine how far the Bluetooth enabled devices are. With AoA, the receiving device can determine the direction from where the incoming signal is coming. With both RSSI and AoA, the receiving device is able to locate and associate the sensors to the artefacts with reasonable/acceptable accuracy. It will be apparent to a person skilled in the art that the receiving device may use only one of the AoA only the RSSI and is not limited to using both AoA and RSSI at the same time.

The gateway device 202 may receive the RSSI and the AoA associated with each of the sensors 208. In some embodiments, the gateway device 202 may include a mapping device 210 (analogous to the mapping device 102). In some embodiments, the gateway device 202 may receive only the RSSI or only the AoA associated with each of the sensors 208.

In some embodiments, the mapping device 210 may be configured to generate a lookup table, using the RSSI and the AoA received from dummy sensors fitted on dummy entities of dummy stack. In some embodiments, the lookup table may include a mapping of the at least one dummy sensor parameter (i.e., the RSSI and the AoA) with an associated predetermined position (for example, x, y, z co-ordinates) of the dummy sensor.

In some embodiments, the gateway device 202 may receive only the RSSI or only the AoA associated with each of the sensors 208. Accordingly, in such embodiments, the mapping device 210 may be configured to generate a lookup table, using one of the RSSI and the AoA received from dummy sensors fitted on dummy entities of a dummy stack. It may be noted that dummy sensors may refer to test sensors fitted on dummy entities, for the purpose of generating a lookup table.

In some embodiments, in order to build the lookup table, the user may build the dummy pallet (stack) by stacking dummy entities (a second plurality of entities) along with dummy sensors (a second plurality of sensors). The gateway device 202 may receive a sensor ID, an RSSI value and an AoA value associated with each of the dummy sensors from each of the dummy sensors. Using the RSSI and AoA associated with each of the dummy sensors, the gateway device 202 may generate a lookup table. This lookup table may include a mapping of a sensor ID of each of the dummy sensors, a position of each of the dummy entities (i.e., position of each of the dummy entities to which a dummy sensor is attached), the RSSI, and the AoA associated with each of the dummy sensors. During operation, the lookup table may be used to determine a position of each of true sensors (a first plurality of sensors) relative to a true stack, based on at least one sensor parameter associated with each of the true sensors. An exemplary lookup table is illustrated in FIG. 4.

Figure 4:
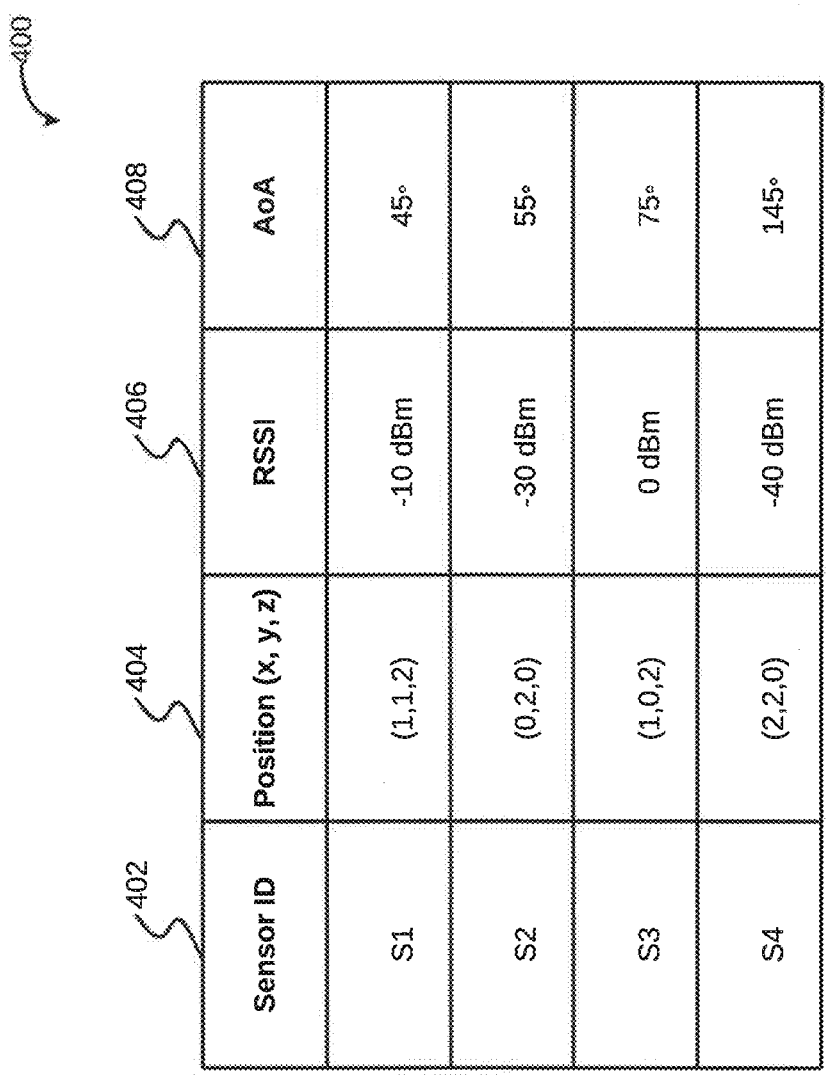
FIG. 4 illustrates a lookup table, in accordance with an exemplary embodiment.

Referring now to FIG. 4, a lookup table 400 is illustrated, in accordance with an exemplary embodiment. By way of an example, the lookup table 400 is created for four sensors having sensor IDs S1, S2, S3, and S4, as shown in a Column 402. A column 404 includes a position coordinates for each of these four sensors, a column 406 includes an RSSI value associated with each of these four sensors, and a column 408 includes an AoA value associated with each of these four sensors. For example, for the sensor S1, the position coordinates (along x, y, and z axes) are (1, 1, 2), the RSSI determined by the gateway device 202 is −10 bBm, and the AoA determined by the gateway device 202 is 45°.

Returning back to FIG. 2, once the lookup table (for example, the lookup table 400) is generated, the gateway device 202 may start associating sensors with entities within a pallet (stack). In order to do so, the pallet builder device 206 may generate an entity placement scheme. It may be understood that the entity placement scheme may be generated for optimally using space on the pallet with proper weight distribution, so as to ensure stability of the pallet. By way of an example, during packaging, i.e., building the pallet, a user may place true entities (a first plurality of entities) to build a true pallet based on the entity placement scheme generated by the pallet builder device 206. Each entity of the true entities may include at least one true sensor. For example, a true sensor may be fitted to each of the true entities.

The gateway device 202 may receive signal transmitted by each true sensor. Upon receiving the signal, the gateway device 202 may capture one or more sensor parameters, such as, a sensor ID, an AoA and a RSSI associated with each true sensor. The gateway device 202 may further receive the entity placement scheme. Using the entity placement scheme and the sensor parameters, the gateway device 202 may determine a position of each of the true sensors with respect to the true pallet. To this end, the gateway device 202 may map the sensor parameters with the lookup table to determine a position of each of the true sensors. Accordingly, the gateway device 202 may associate each of the true sensors with each of the true entities which is located in that position by looking into the entity placement scheme. It may be understood that a pallet (for example, a pallet 304) may not be limited to cartons, and may include any other boxes, or products. Further, the placement of the gateway device 302 may not be limited to be on the pallet itself, and the gateway device 302 may be placed at any location within a distance from the pallet, such that, the distance is supported by the communication protocol.

Figure 5:
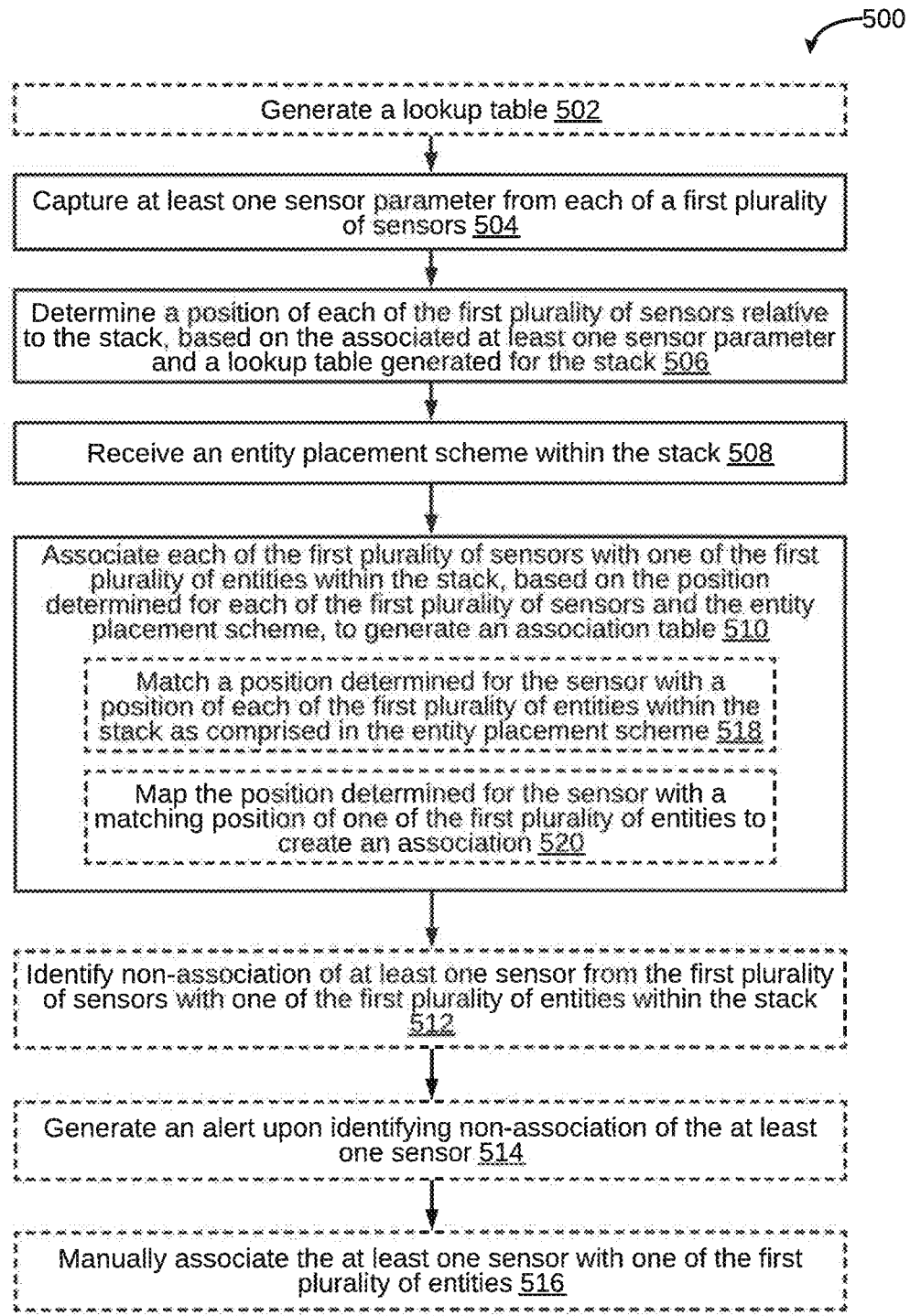
FIG. 5 illustrates a flowchart of a method of associating sensors with entities within a stack, in accordance with an embodiment.

Referring now to FIG. 5, a flowchart 500 of a method of associating sensors with entities placed within a stack is illustrated, in accordance with an embodiment. By way of an example, the method may be performed by the mapping device 102. In some embodiments, the mapping device 102 may start associating true sensors with true entities within a true stack upon generating a lookup table. The lookup table may be generated by the mapping device 102 using dummy sensors fitted on dummy entities within a dummy stack. In alternate embodiments, the lookup table may be generated by a third party. Accordingly, the mapping device 102 may receive a ready-made lookup table.

At step 502, a lookup table may be generated for a stack. A first plurality of entities are placed within a stack and each of a first plurality of sensors is attached to an entity from the first plurality of entities. At step 504, at least one sensor parameter may be captured from each of the first plurality of sensors. At step 506, a position of each of the first plurality of sensors relative to the stack may be determined, based on the associated at least one sensor parameter and the lookup table generated for the stack. At step 508, an entity placement scheme within the stack may be received. Based on the position determined for each of the first plurality of sensors and the entity placement scheme, at step 510, each of the first plurality of sensors may be associated with one of the first plurality of entities within the stack to generate an association table.

At step 512, a non-association of at least one sensor from the first plurality of sensors with one of the first plurality of entities within the stack may be determined. At step 514, an alert may be generated upon identifying non-association of the at least one sensor. At step 516, the at least one sensor may be manually associated with one of the first plurality of entities.

Now, to explain steps 502 to 520 in detail, At step 502, a lookup table may be generated. The generation of the lookup table is further explained in conjunction with FIG. 6.

Figure 6:
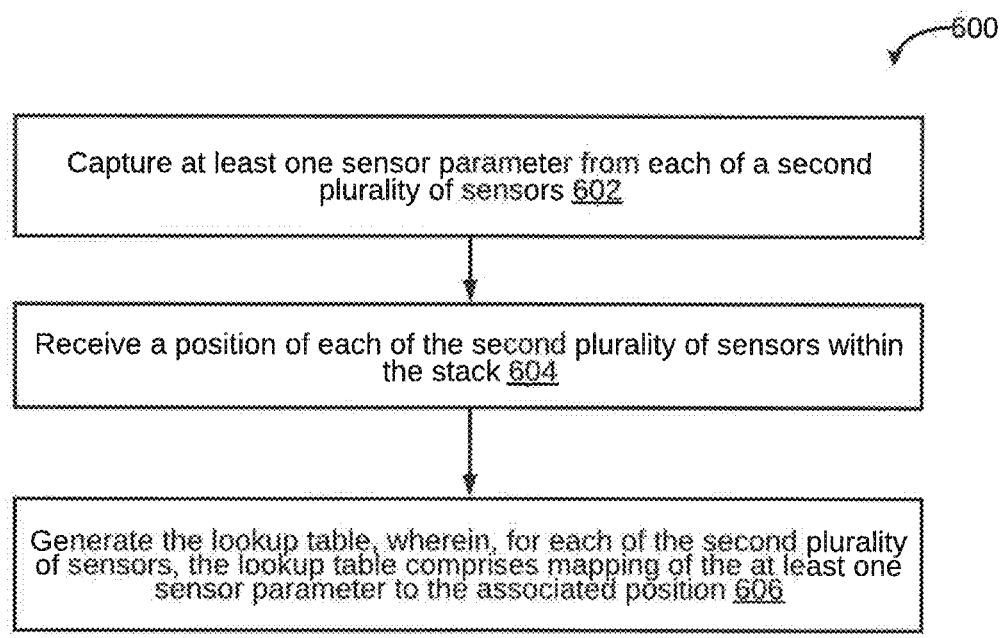
FIG. 6 illustrates a flowchart of a method of generating a lookup table for associating sensors with entities within a stack, in accordance with an embodiment

Referring now to FIG. 6, a flowchart 600 of a method of generating a lookup table for associating sensors with entities within a stack is illustrated, in accordance with an embodiment. The method may be performed by the mapping device 102. At step 602, at least one sensor parameter may be captured from each of a second plurality of sensors (dummy sensors). At step 604, a position of each of the second plurality of sensors within the stack may be determined. At step 606, the lookup table may be generated, wherein, for each of the second plurality of sensors, the lookup table may include mapping of the at least one sensor parameter to the associated position.

Now, to explain the steps 602 to 606 in detail, at step 602, at least one sensor parameter may be captured from each of a second plurality of sensors (dummy sensors). The at least one sensor parameter may include a sensor ID, an AoA, and an RSSI associated with each of the second plurality of sensors. It may be noted that each of the second plurality of sensors may be attached to an entity from a second plurality of entities (dummy entities) placed within a stack (a dummy stack). At step 604, a position of each of the second plurality of sensors within the stack may be determined. The position of each of the second plurality of sensors may be predetermined based on a predetermined position of each of the second plurality of entities within the stack. Thus, at step 604, the lookup table may be generated. It may be understood that for each of the second plurality of sensors, the lookup table may include mapping of the at least one sensor parameter to the associated position. It may be further understood that the lookup table may be used to determine a position of each of a first plurality of sensors relative to the stack, based on the at least one sensor parameter associated with each of the first plurality of sensors.

Returning back to FIG. 5, at step 504, at least one sensor parameter may be captured from each of the first plurality of sensors (true sensors). It may be noted that the at least one sensor parameter may include a sensor ID, an AoA, and an RSSI associated with each of the first plurality of sensors. It may further be noted that the first plurality of sensors and the mapping device 102 may include a communication module compliant with a wireless communication protocol. For example, the communication module may be compliant with Bluetooth 5.1 protocol, or any other version higher than the Bluetooth 5.1. At step 506, the position of each of the first plurality of sensors relative to the stack may be determined, based on the associated at least one sensor parameter and the lookup table generated for the stack. It may be noted that a user may have attached the first plurality of sensors to the entities randomly. At step 508, the entity placement scheme within the stack may be received. The entity placement scheme may include an ID of each of the first plurality of entities and a position of each of the first plurality of entities within the stack. For example, when a real shipment (including a stack) has to be packaged, a pallet builder device (for example, the pallet builder device 206) may generate the entity placement scheme. The entity placement scheme may be generated for appropriate weight distribution of the entities within the stack.

Based on the position determined for each of the first plurality of sensors and the entity placement scheme, at step 510, each of the first plurality of sensors may be associated with one of the first plurality of entities within the stack. In some embodiments, associating the first plurality of sensors with one of the first plurality of entities, may further include matching a position determined for a sensor from the first plurality of sensors with a position of each of the first plurality of entities within the stack as comprised in the entity placement scheme, at step 518. The associating may further include mapping the position determined for the sensor with a matching position of one of the first plurality of entities to create an association, at step 520. For example, a closest match of the received RSSI and AoA received from each sensor with the lookup table may be determined. Accordingly, an approximate position of the sensor may be determined, if a match exists. If a closest match exists, the mapping device 102 may now lookup in the entity placement scheme to obtain an entity ID by matching the position of the sensor with the position of the entity.

In some embodiments, upon associating each of the first plurality of sensors with one of the first plurality of entities within the stack, an association table may be generated. By way of an example, the association table may be pasted on the stack (pallet) in order to guide a user as to which sensor is associated with which entity within the stack. An association table is shown, for example, in FIG. 7.

Figure 7:
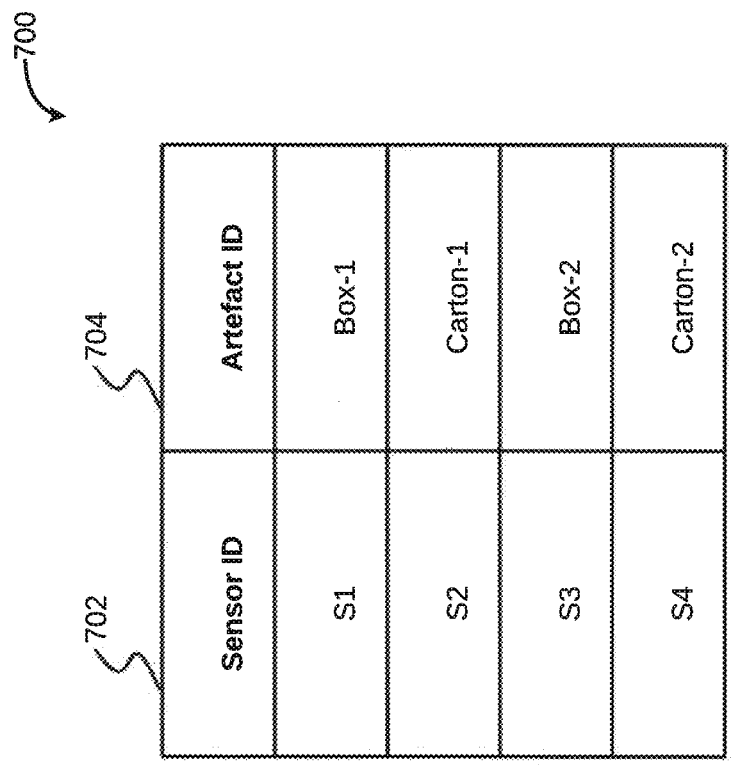
FIG. 7 illustrates an association table, in accordance with an exemplary embodiment.

Referring now to FIG. 7, an association table 700 is illustrated, in accordance with an exemplary embodiment. The association table 700 depicts an association of one or more sensors with one or more artefacts (entities). A column 702 of the association table 700 includes sensor IDs and a column 704 of the association table 700 includes artifact IDs. For example, a sensor S1 is associated with a box-1, a sensor S2 is associated with a carton-1, and so on.

Returning back to FIG. 5, at step 512, a non-association of at least one sensor from the first plurality of sensors with one of the first plurality of entities within the stack may be determined. At step 514, an alert may be generated upon identifying non-association of the at least one sensor. At step 516, the at least one sensor may be manually associated with one of the first plurality of entities. In other words, if the mapping device 102 is not able to find any closest match, the mapping device 102 may generate an alert to will notify the user to make the association for that sensor manually.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
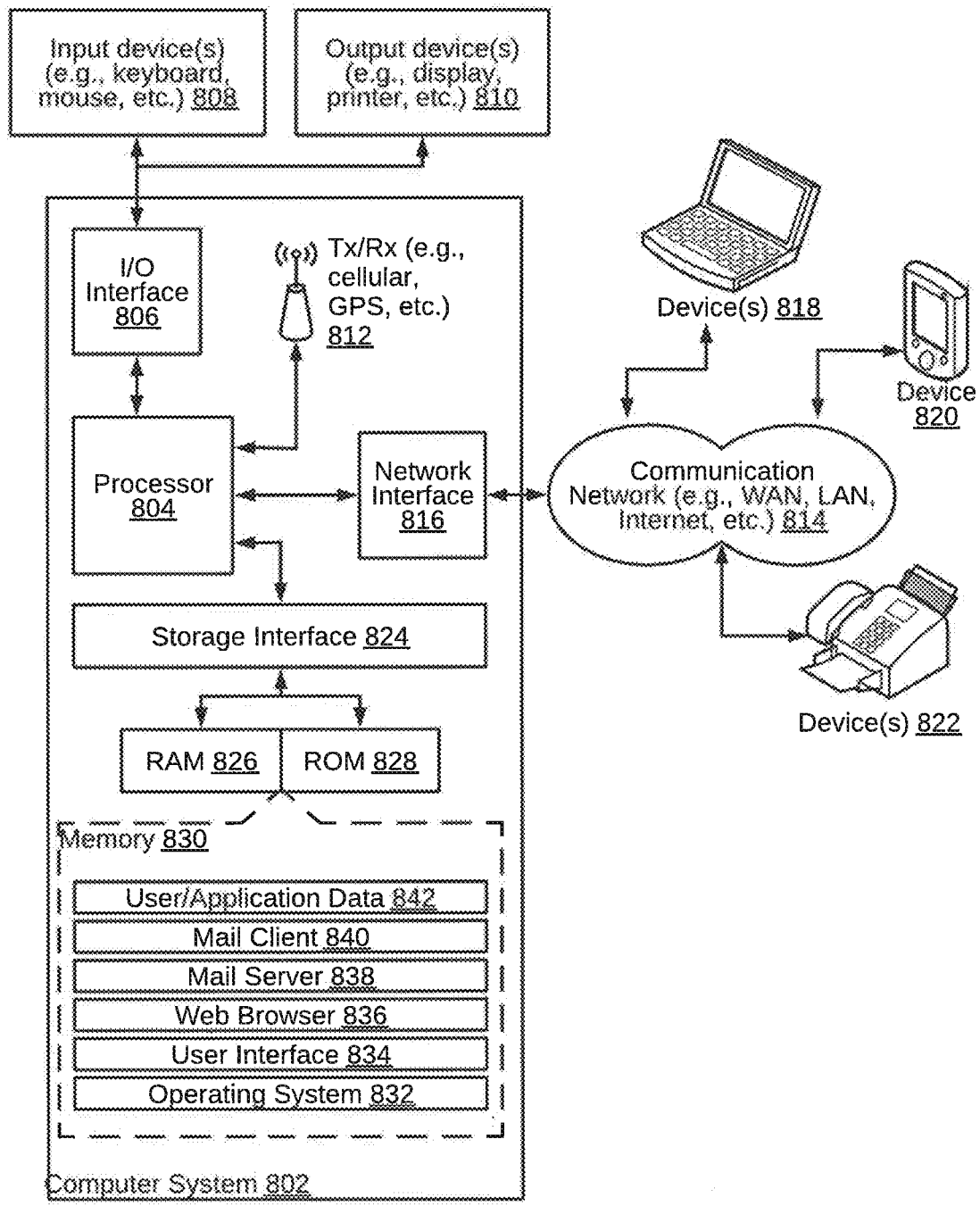
FIG. 8 illustrates a block diagram of an exemplary computer system for implementing various embodiments.

The disclosed methods and systems may be implemented on a conventional or a general-purpose computer system, such as a personal computer (PC) or server computer. Referring now to FIG. 8, a block diagram of an exemplary computer system 802 for implementing various embodiments is illustrated. Computer system 802 may include a central processing unit ("CPU" or "processor") 804. Processor 804 may include at least one data processor for executing program components for executing user or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dangle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 810 may be a printer, fax machine, video display (for example, cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (for example, using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 802 may itself embody one or more of these devices.

In some embodiments, processor 804 may be disposed in communication with one or more memory devices (for example, RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 830 may store a collection of program or data repository components, including, without limitation, an operating system 832, user interface application 834, web browser 836, mail server 838, mail client 840, user/application data 842 (for example, any data variables or data records discussed in this disclosure), etc. Operating system 832 may facilitate resource management and operation of computer system 802. Examples of operating systems 832 include, without limitation, APPLE® MACINTOSH® OS X platform, UNIX platform, Unix-like system distributions (for example, Berkeley Software Distribution (BSD), Free-BSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOGGLE® ANDROID® platform, BLACKBERRY® OS platform, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 802 may implement a web browser 836 stored program component. Web browser 836 may be a hypertext viewing application, such as MICROSOFT® INTERNET EXPLORER® web browser, GOGGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 802 may implement a mail server 838 stored program component. Mail server 838 may be an Internet mail server such as MICROSOFT® EXCHANGE® mail server, or the like. Mail server 838 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 838 may utilize communication protocols such as internet message access protocol (IMAP), messaging application programming interface (MAPI). Microsoft Exchange, post office protocol (POP), simple mail transfer protocol (SMTP), or the like. In some embodiments, computer system 802 may implement a mail client 840 stored program component. Mail client 840 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such data repositories may be implemented as fault-tolerant, relational, scalable, secure data repositories such as ORACLE® data repository OR SYBASE® data repository. Alternatively, such data repositories may be implemented using standardized data structures, such as an array, hash, linked list, struct, structured text file (for example, XML), table, or as object-oriented data repositories (for example, using OBJECTSTORE® object data repository, POET® object data repository, ZOPE® object data repository, etc.). Such data repositories may be consolidated or distributed, sometimes among the various computer systems discussed above in this disclosure. It is to be understood that the structure and operation of the any computer or data repository component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

One or more techniques described in the various embodiments discussed above provide for automate association sensors with entities. The techniques further provide for generating a lookup table using dummy sensors, based on AoA and RSSI values of the dummy sensors and locations of the dummy sensors with respect to a dummy stack. The techniques further provide for determining position of test sensors fitted on test entities, and creating an association table. For example, once the test sensors are attached on to the test entities, sensor parameters (sensor ID, RSSI values, and AoA values associated with each of the sensors) may be received. The sensor parameters may then be correlated with the lookup table, to determine the association of the test sensors with the test entities. The techniques further provide for generating an alert in case an association is not determined. Further, when the entity placement scheme is not available, the techniques may allow manual entry of the entity placement scheme.

As will be appreciated by those skilled in the art, the above techniques provide for automatically associating a sensor to an entity, without requiring any manual intervention. The techniques provide for wireless tracking of objects. By automating the above process, the above techniques provide a labor efficient and time efficient solution. Further, by reducing or eliminating manual intervention, the above techniques provide an accurate (low error) solution to associating sensors to entities. By automating the process, the techniques further provide for proper monitoring of the sensor data. This helps in accurately locating the object where any alert has occurred. Overall, productivity and efficiency is improved.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of associating sensors with entities within a stack, the method comprising:
    capturing, by a mapping device, at least one sensor parameter from each of a first plurality of sensors, wherein each of the first plurality of sensors is attached to an entity from a first plurality of entities placed within a stack;
    determining, by the mapping device, a position of each of the first plurality of sensors relative to the stack, based on the associated at least one sensor parameter and a lookup table generated for the stack;
    receiving, by the mapping device, an entity placement scheme within the stack, wherein the entity placement scheme comprises an Identification (ID) of each of the first plurality of entities and a position of each of the first plurality of entities within the stack; and
    associating, by the mapping device, each of the first plurality of sensors with one of the first plurality of entities within the stack, based on the position determined for each of the first plurality of sensors and the entity placement scheme, to generate an association table, wherein, for a sensor from the first plurality of sensors, associating comprises:
        matching a position determined for the sensor with a position of each of the first plurality of entities within the stack as comprised in the entity placement scheme; and
        mapping the position determined for the sensor with a matching position of one of the first plurality of entities to create an association.

2. The method of claim 1, wherein the at least one sensor parameter comprises a sensor ID, an Angle of Arrival (AoA), and a Received Signal Strength Indicator (RSSI) associated with each of the first plurality of sensors.

3. The method of claim 1, further comprising generating the lookup table, wherein generating the lookup table further comprises:
    capturing at least one sensor parameter from each of a second plurality of sensors, wherein each of the second plurality of sensors is attached to an entity from a second plurality of entities placed within the stack;
    receiving a predetermined position of each of the second plurality of sensors relative to the stack; and
    generating the lookup table for the stack, wherein, for each of the second plurality of sensors, the lookup table comprises mapping of the at least one sensor parameter to the associated predetermined position.

4. The method of claim 3, wherein each of the first plurality of sensors, the second plurality of sensors, and the mapping device comprises a communication module compliant with a wireless communication protocol.

5. The method of claim 1, further comprising identifying non-association of at least one sensor from the first plurality of sensors with one of the first plurality of entities within the stack.

6. The method of claim 5, further comprising generating an alert upon identifying non-association of the at least one sensor.

7. The method of claim 5, further comprising manually associating the at least one sensor with one of the first plurality of entities.

8. A mapping device for associating sensors with entities within a stack, the mapping device comprising:
- a processor; and
- a memory communicatively coupled to the processor, wherein the memory stores processor instructions, which, on execution, causes the processor to:
- capture at least one sensor parameter from each of a first plurality of sensors, wherein each of the first plurality of sensors is attached to an entity from a first plurality of entities placed within a stack;
- determine a position of each of the first plurality of sensors relative to the stack, based on the associated at least one sensor parameter and a lookup table generated for the stack;
- receive an entity placement scheme within the stack, wherein the entity placement scheme comprises an Identification (ID) of each of the first plurality of entities and a position of each of the first plurality of entities within the stack; and
- associate each of the first plurality of sensors with one of the first plurality of entities within the stack, based on the position determined for each of the first plurality of sensors and the entity placement scheme, to generate an association table, wherein for a sensor from the first plurality of sensors, associating comprises:
  - matching a position determined for the sensor with a position of each of the first plurality of entities within the stack as comprised in the entity placement scheme; and
  - mapping the position determined for the sensor with a matching position of one of the first plurality of entities to create an association.

9. The mapping device of claim 8, wherein the at least one sensor parameter comprises a sensor ID, an Angle of Arrival (AoA), and a Received Signal Strength Indicator (RSSI) associated with each of the first plurality of sensors.

10. The mapping device of claim 8, wherein the processor instructions further cause the processor to generate the lookup table, wherein generating the lookup table further comprises:
- capturing at least one sensor parameter from each of a second plurality of sensors, wherein each of the second plurality of sensors is attached to an entity from a second plurality of entities placed within the stack;
- receiving a predetermined position of each of the second plurality of sensors relative to the stack; and
- generating the lookup table for the stack, wherein, for each of the second plurality of sensors, the lookup table comprises mapping of the at least one sensor parameter to the associated predetermined position.

11. The mapping device of claim 10, wherein each of the first plurality of sensors, the second plurality of sensors, and the mapping device comprises a communication module compliant with a wireless communication protocol.

12. The mapping device of claim 8, wherein the processor instructions further cause the processor to:
- identify non-association of at least one sensor from the first plurality of sensors with one of the first plurality of entities within the stack;
- generate an alert upon identifying non-association of the at least one sensor; and
- manually associate the at least one sensor with one of the first plurality of entities.

13. The mapping device of claim 8, wherein the processor instructions further cause the processor to identify non-association of at least one sensor from the first plurality of sensors with one of the first plurality of entities within the stack.

14. The mapping device of claim 13, wherein the processor instructions further cause the processor to generate an alert upon identifying non-association of the at least one sensor.

15. The mapping device of claim 13, wherein the processor instructions further cause the processor to manually associate the at least one sensor with one of the first plurality of entities.

16. A non-transitory computer-readable storage medium having stored thereon, a set of computer-executable instructions causing a computer comprising one or more processors to perform steps comprising:
- capturing at least one sensor parameter from each of a first plurality of sensors, wherein each of the first plurality of sensors is attached to an entity from a first plurality of entities placed within a stack;
- determining a position of each of the first plurality of sensors relative to the stack, based on the associated at least one sensor parameter and a lookup table generated for the stack;
- receiving an entity placement scheme within the stack, wherein the entity placement scheme comprises an Identification (ID) of each of the first plurality of entities and a position of each of the first plurality of entities within the stack; and
- associating each of the first plurality of sensors with one of the first plurality of entities within the stack, based on the position determined for each of the first plurality of sensors and the entity placement scheme, to generate an association table, and wherein, for a sensor from the first plurality of sensors, associating comprises:
  - matching a position determined for the sensor with a position of each of the first plurality of entities within the stack as comprised in the entity placement scheme; and
  - mapping the position determined for the sensor with a matching position of one of the first plurality of entities to create an association.

* * * * *